United States Patent [19]

Trotter, Jr.

[11] Patent Number: 4,526,785
[45] Date of Patent: Jul. 2, 1985

[54] METAL PATTERNS ON PHOTOSENSITIVE GLASSES

[75] Inventor: Donald M. Trotter, Jr., Corning, N.Y.

[73] Assignee: Corning Glass Works, Corning, N.Y.

[21] Appl. No.: 544,124

[22] Filed: Oct. 21, 1983

[51] Int. Cl.$^3$ .......................................... B32B 17/00
[52] U.S. Cl. ................................. 428/209; 428/210; 428/410; 428/432; 428/433; 428/434
[58] Field of Search ............... 428/410, 141, 148, 209, 428/210, 432–434

[56] References Cited

U.S. PATENT DOCUMENTS

| | | | |
|---|---|---|---|
| 4,297,417 | 10/1981 | Wu | 428/410 |
| 4,405,672 | 9/1983 | Araujo et al. | 428/410 |
| 4,407,891 | 10/1983 | Ernsberger | 428/410 |

Primary Examiner—Bruce H. Hess
Assistant Examiner—P. R. Schwartz
Attorney, Agent, or Firm—C. S. Janes, Jr.

[57] ABSTRACT

There is disclosed a metal-glass composite comprising a photosensitive glass body with opacifying crystallites developed in at least a portion of the body, and a metal deposit on and/or in that portion of the glass surface coincident with the crystallized portion of the glass body, the metal deposit exhibiting useful electrical conductivity. There is further disclosed a method of producing such composite by forming crystallites in at least a portion of a glass body, subjecting at least the surface coincident therewith to a cationic ion exchange to introduce metal ions and thereafter firing the ion-exchanged glass in a hydrogen atmosphere to cause the metal ions to be reduced and subsequently migrate surfaceward and form a metal deposit.

10 Claims, 2 Drawing Figures

METAL PATTERNS ON PHOTOSENSITIVE GLASSES

This invention is concerned with a metal-glass composite composed of a photosensitive, crystallizable glass body and an electrical conductor or other metal pattern formed on and/or in the photosensitive glass surface. It is particularly concerned with a unique method of forming the metal patterns on such glass surfaces.

Photosensitive glasses contain a small amount of gold, silver, palladium and/or copper, a small amount of cerium oxide as a sensitizer, and major amounts of the more usual glass-making materials such as silica, alumina and alkali metal oxides. When these glasses are irradiated with short wavelength light (usually ultraviolet), electrons are transferred from $Ce^{+3}$ ions to trapping sites in the glass. Subsequent heat treatment of the glasses, at temperatures intermediate the glass annealing and softening points, causes the electrons to diffuse to the metal ions thereby reducing them to the zero valence state. The metal atoms then agglomerate to form collodial particles which nucleate precipitation of a crystalline phase in the glass. Any unexposed zone in the glass remains unchanged, of course, and no crystalline phase is developed in such zone.

The crystalline phase developed depends on the composition of the glass. Thus U.S. Pat. No. 2,515,940 (Stookey) discloses glasses in which a lithium disilicate phase is formed. The glasses are essentially silicate glasses containing 10-25% $Li_2O$ and the customary photosensitive agents gold, silver, and/or Cu plus cerium oxide. U.S. Pat. No. 2,684,911 (Stookey) discloses glasses in which a lithium metasilicate or disilicate phase predominates depending on the alkali metal oxide. These glasses contain 70-85% $SiO_2$, 9-15% $Li_2O$, 0-8% $Na_2O$, 0-8% $K_2O$, 9-23% total alkali metal oxide, 0-8% $Na_2O+K_2O$, 0-10% $Al_2O_3$, plus the usual photosensitive agents. U.S. Pat. No. 2,515,941 (Stookey) discloses glasses wherein the crystal phase is barium disilicate and the glass contains 50-65% $SiO_2$, 5-15% of $Na_2O$, $K_2O$, or a mixture thereof, 15-45% BaO, and photosensitive agents. U.S. Pat. No. 2,515,943 and No. 2,651,146 discloses glasses wherein an alkali metal fluoride phase may be developed and which are composed of 55-75% $SiO_2$, 12-18% of $Na_2O$, $Na_2O+Li_2O$, or $Na_2O+K_2O$, 2-12% $Al_2O_3$, 1.8-2.4% F and photosensitive agents.

With a particular schedule of ultra-violet radiation and heat treatment, the glasses having the potential to develop a sodium fluoride phase may be transformed into polychromatic glasses exhibiting a wide range of colors. See U.S. Pat. No. 4,017,318 (Pierson-Stookey).

The lithium silicate glasses have found utility in chemically machined glass products sold by Corning Glass Works under the FOTOFORM trademark. In this connection, attention is directed to U.S. Pat. No. 2,628,160. This patent reviews the prior patent disclosures of photosensitive opal glasses and methods. It also discloses the large difference in acid etching rates between opacified and clear areas, and the consequent ability to selectively machine or sculpture glass.

PURPOSE OF THE INVENTION

The basic purpose is to find new utilities for photosensitive glasses known in the art, and to develop means of treating and/or modifying such glasses to render them capable of new uses.

A more specific purpose is to produce useful electrical elements composed of metal deposits on a crystallizable photosensitive glass surface.

PRIOR LITERATURE

A number of U.S. patents relating to photosensitive opal glasses have been mentioned earlier. In the discussion that follows, each patent referred to is also a U.S. Pat., and such disignation will be omitted.

Nos. 2,651,146 and 2,911,749 (both Stookey) disclose use of an ion exchange procedure to introduce silver into a glass surface, thereby rendering the ion-exchanged glass layer photosensitive. In the latter patent, a silver image in the glass was intensified in color by firing in hydrogen. No. 3,419,370 also describes introducing silver into a glass surface by ion exchange. In this case, photochromicity is developed in the glass surface.

No. 4,017,318 (Pierson et. al) discloses polychromatic glasses based on silver, and No. 4,118,214 discloses using a hydrogen firing step to replace a second exposure to short wave length radiation.

Nos. 3,892,582 and 3,920,463 (Simms), No. 4,240,836 (Borrelli et al.) and 4,290,794 (Wedding) all relate to developing fixed colors in photochromic glasses by firing the glass in a reducing atmosphere under specified conditions.

No. 2,281,076 (Nash) includes up to one percent silver salt in a glass batch, rolls sheet from the melted batch, and fires the sheet in a reducing atmosphere to give a reflecting surface. No. 2,999,339 (Hensler) melts an alkali metal-barium-aluminum-silver phosphate glass with at least 8% silver phosphate. The molded glass is fired for 2-3 hours at 300°-400° C. in hydrogen to produce a surface film of silver having a resistivity below ten ohms/square.

No. 2,647,068 (Patai) diffuses silver into glass from silver nitrate at a temperature not over 300° C., and fires in hydrogen at 600° C. to provide a reflecting film. Mention is also made of resistor production wherein metal is crystallized by firing, and the initial high resistance of the metal film is thereby lowered. No. 3,622,295 (Loukes et al.) alternately introduces silver into float glass by electrolysis and then fires reducingly to build up a metal layer in the glass.

No. 3,231,456 (McMillan et al.) describes heat treating in hydrogen $Li_2O$—$Al_2O_3$—$SiO_2$ glasses containing gold, silver, or copper and a nucleating agent, $P_2O_5$. This simultaneously crystallizes the glass in situ and causes silver to migrate to the surface and form a film. No. 3,464,806 (Seki et al.) provides a similar disclosure. No. 3,790,360 (Kato et al.) adds to Seki et al. −806 a metal film composed of discrete particles which can be converted to a continuous oxide film by oxidation. Furthermore, the oxide film can then be converted to a continuous metal film by a second reduction firing.

SUMMARY OF THE INVENTION

The article of the invention is a metal-glass composite comprising a photosensitve glass body with opacifying crystallites developed in at least a portion thereof, and a metal deposit on and/or in that portion of the glass surface coincident with the crystallized portion of the body, the metal deposit exhibiting useful electrical conductivity. In one embodiment, the entire body is opacified uniformly; in another, different portions of the body are opacified to different degrees; in still another, a portion of the body remains clear and unopacified.

The physical nature and electrical properties of the metal film vary with the degree of crystallinity.

In carrying out the method of the invention, known crystallizable photosensitive glasses are employed, and known crystallization procedures are adopted. Certain controls and critical further steps are then added. Thus, a crystallizable photosensitive glass is at least partially opacified by a controlled exposure of the glass to short wavelength radiation followed by heat treatment. At least that portion of the glass surface corresponding to the thus opacified zone is then exposed to a source of readily reducible, exchangeable metal ions and heat treated to effect exchange of the metal ions into the glass surface. Thereafter, the ion-exchanged glass is fired in a hydrogen containing atmosphere to produce a pattern of metal particles on the glass surface and extending up to 100 microns into the glass. In different embodiments, portions of the glass body are crystallized to different degrees by varying the radiation and heat treatment procedure between zones in the photosensitive glass body.

The metal may be any known exchangeable metal ion that is readily reducible and which, when formed as a surface deposit, exhibits useful electrical conductivity. As a practical matter, this includes silver, copper and thallium, silver being preferred.

GENERAL DESCRIPTION

The invention arises from my discovery that a metal ion that is both ion exchangeable into a glass and readily reducible may behave in a unique manner. Thus, when such a metal ion is ion exchanged into a crystallized photosensitive glass, and then fired in a hydrogen-containing atmosphere, the ion may reduce to the atomic state, migrate surfaceward, and form a deposit of metallic particles. It is further based on my discovery that this metal deposit has electrical transport properties that vary with the degree of crystallinity in the glass, and can thereby be controlled.

The invention is effective with any of the known crystallizable photosensitive glasses. These include glasses in which such opacifying crystallites as lithium silicates, barium silicate and alkali metal fluorides may be developed. Such glasses, and their treatment to develop opacifying crystallites, are fully disclosed in patents earlier mentioned. Accordingly, these disclosures are incorporated by reference to avoid repetition.

A crystallizable, photosensitive glass has microscopic crystallites developed therein by exposure to short wavelength radiation, usually UV radiation, followed by a heat treatment. The radiation results in electron transfer, and subsequent heat treatment results in nucleation and crystalline development on the nuclei. The degree of crystallinity that may be developed in a given glass has been found to depend on the degree of radiation exposure. Thus, maximum crystallinity results with exposures on the order of two to five (2-5) minutes. Longer times appear to ultimately produce many fine nuclei that do not grow adequately to produce opacifying crystallites.

The present procedure involves exposing a crystallized, photosensitive glass to metal ion exchange. This may be by any of the well-known exchange procedures. Probably the oldest practice is application of an ionizable metal salt to a glass surface, usually in a clay or other carrier, and firing. More recently, molten salt baths have been used. Again, the ion exchange technique employed is not critical. The requirement is that metal ions be exchanged into the glass surface in exchange for alkali ions in the glass.

The ion-exchanged glass is now fired in a hydrogen atmosphere to reduce to the metallic state the ions introduced into the glass by ion exchange. The firing temperature is not critical and may range from 300° C. up to the glass strain point, or somewhat higher depending on the criticality of glass sagging. Pure hydrogen is preferred, but forming gas, city gas, cracked ammonia, and other hydrogen-containing atmospheres may be employed.

It has been found that at least some of the metal introduced by ion exchange tend to migrate to the glass surface during hydrogen firing. Further, it may deposit in forms having at least three distinct electrical behavior patterns, depending on glass crystallinity, and correspondingly on the radiation exposure incident to such crystal development.

Thus, when a clear glass is used, that is an unexposed, and hence uncrystallized, glass, the metal tends to form in disconnected islands during the hydrogen firing. The surface shows an activated resistivity on the order of $10^{12}$ ohms/square which may result from ionic transport in the glass and/or electron tunneling between metal islands.

In contrast, if a fully crystallized glass sample is employed, a continuous metal layer forms on hydrogen firing. The resistivity is on the order of one ohm/square.

When a glass has been given an exposure longer than about five (5) minutes, less than maximum crystallization occurs. The metal layer produced by hydrogen firing tends to be like that found on a clear glass sample, but can be readily switched to a lower resistance state by outside influence.

The discovery that led to the invention involved ion exchange and formation of a silver metallized surface. For most purposes this is still considered most effective. The various characteristics observed, when this preferred species is employed with different degrees of crystallinity in the glass, may be summarized as follows:

(1) No UV exposure/no crystalline material—activated resistivities of order $10^{12}$ ohms/square resulting from ionic transport in the glass with activation energy $(E_a) \sim 0.7$ eV and from electron tunneling between Ag islands with $(E_a) \sim 0.010$ ev. With long hydrogen firing times, electron tunneling becomes the dominant charge transport mechanism and resistivities $\sim 10^{10}$–$10^{11}$ ohms/square, nearly linear in temperature with coefficients (TC) $\sim -500$ ppm/°C., are obtained. The material is then characterized by excess noise and occasionally by switching as described in (3). Further hydrogen firing results in a percolation transition to a metallically conducting state with R $\sim$ 1000-2000 ohm/square, temperature coefficient (TC) $\sim +1000$ ppm/°C. and small-scale excess noise.

(2) UV exposure producing maximum crystallization—continuous Ag layer forms on the surface of the material after short hydrogen firing. Resistivity $\sim 1$ ohm/square, TC $\sim +2000$ ppm/°C. After long H$_2$ firing, the resistivity drops to $\sim 0.1$ ohm/square, temperature coefficient (TC) remains $\sim +2000$ ppm/°C.

(3) Excess UV exposure/less than maximum crystallization—transport similar to (1). Switches readily to lower resistance state ($\Delta R \sim 10^8$ ohms/square) upon application of a large in-plane dc voltage or out-of-plane RF field. Resistance sometimes decays back upward with time; sometimes a brief heat treatment is needed to restore the initial high resistance state.

Similar effects are observed when crystallized, photosensitive glass is ion exchanged with $Cu^+$ and thereafter hydrogen fired. Thus, employing a well crystallized glass, a continuous copper layer having a conductivity of about 2 ohms/square at temperature coefficient of about 1500 ppm/°C. can be produced. In contrast, a clear glass sample, given similar exposure, ion exchange and hydrogen firing, develops a discontinuous layer of discrete copper islands through which conduction occurs via electron tunneling. These discontinuous layers are characterized by activated conductivities on the order of $10^{12}$ ohms/square with activation energies in the range of 0.050 to 0.070 eV.

Inasmuch as thallium is known to ion exchange in the same manner as do silver and cuprous ions, there is no reason to believe that it would not perform in the same manner as silver and copper. However, the toxic nature of thallium makes it less desirable to handle, particularly in the molten, and hence vaporous, state.

DESCRIPTION OF THE DRAWING

In the attached drawing.

SPECIFIC DESCRIPTION

TABLE I below, sets forth three representative photosensitive opal glass compositions that have been used in specific studies. The results obtained with all glasses were approximately the same. The compositions are calculated from the batch in parts by weight in view of the minor constituents, but approximate a hundred parts. The glass of composition A has a lithium silcate opal phase developed by radiation and heat treatment, while the glasses of compositions B and C have sodium fluoride phases developed.

TABLE I

|  | A | B | C |
| --- | --- | --- | --- |
| $SiO_2$ | 79.1 | 72.0 | 69.7 |
| $Na_2O$ | 1.6 | 16.2 | 15.8 |
| $K_2O$ | 4.2 | — | — |
| $Li_2O$ | 9.4 | — | — |
| $Al_2O_3$ | 4.2 | 6.8 | 6.8 |
| ZnO | 1.0 | 5.0 | 4.9 |
| F | — | 2.5 | 2.5 |
| $CeO_2$ | 0.015 | 0.1 | 0.04 |
| Ag | 0.115 | 0.03 | 0.014 |
| Au | 0.001 | — | — |
| Br | — | 0.4 | 1.1 |
| SnO | 0.003 | 0.12 | 0.05 |
| $Sb_2O_3$ | 0.4 | 0.5 | 0.2 |

Test pieces of glass A were obtained as 1.5 mm thick rolled sheet. Glass B was obtained as 0.025" drawn sheet and glass C as ground and polished 0.027" plate.

Figure 1:
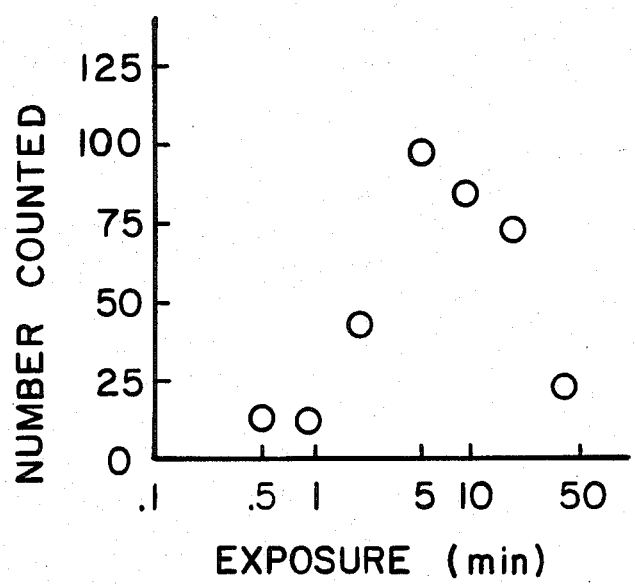
FIG. 1 is a graphical illustration of the relationship between crystallite development and time of exposure to activating radiation.

Samples of glass A were uniformly exposed to ultraviolet radiation from a Hanovia 435 watt mercury arc lamp at a distance of about 15 inches. Exposure time was varied from a few seconds up to 100 minutes for comparison purposes. The samples were then heat treated to develop lithium metasilicate crystals. At this point, the number densities of lithium metasilicate crystallites were determined by electron microscopy. The results are shown in FIG. 1 wherein number density is plotted on the vertical axis versus time in minutes on the horizontal axis. It is apparent that a maximum density occurs with approximately two to five minutes exposure. It is speculated that radiation exposures beyond about five minutes tend to produce copious quantities of trapped electrons which result in formation of a large number of very small metal particles, only a few of which are large enough to nucleate opacifying lithium metasilicate crystals.

The several glass samples provided by varying exposures, and hence varying crystallinity, were then immersed in a one mole percent $AgNO_3$ (balance $NaNO_3$) molten bath and held 16 hours while the bath was maintained at 375° C. Duplicate sets were ion exchanged in two and five mole percent $AgNO_3$ (balance $NaNO_3$) molten baths.

Figure 2:
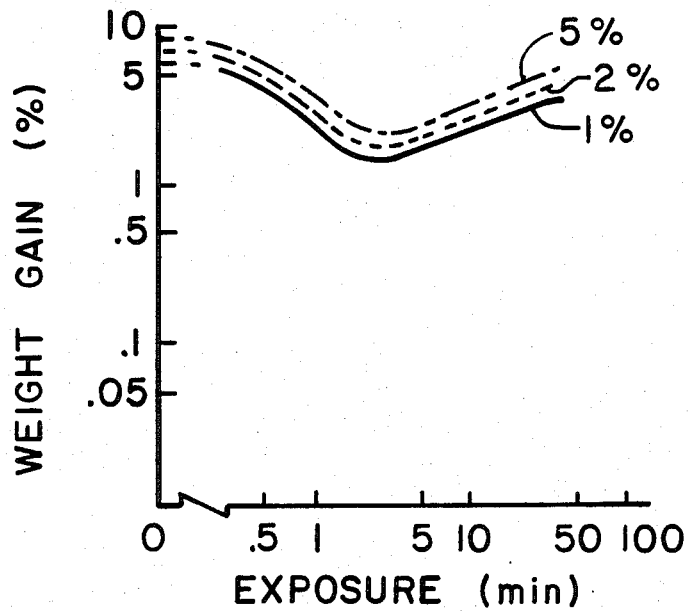
FIG. 2 is a graphical illustration of the relationship between percent weight gain from an ion exchange treatment and time of exposure to activating radiation.

Weight gains were measured on all samples. The data are plotted in FIG. 2 wherein weight gain, in percent, is plotted on the vertical axis and exposure time, in minutes, is plotted on the horizontal axis. Both scales are on a logarithmic basis. It will be observed that minimum weight gains were recorded in the two to five minute exposure samples thus correlating with the exposure times wherein crystallite number density were maximum.

Patterns were defined on glass samples by applying photographic masks, metallized masks, or black optical tape prior to exposure. All samples were exposed to ultraviolet radiation from a Hanovia 435 watt mercury arc lamp at a distance of about 15 inches.

Following the ultraviolet light exposure, the samples were unmasked, and then heat treated to develop opal crystals in exposed areas. The sodium fluoride opal glasses (Examples B and C) were heat treated for twenty minutes at 600° C. The lithium silicate glass (Ex. A) was heated at 200° C./hr to 560° C., held for 30 minutes, then heated to 600° C. in 15 minutes and held for 30 minutes. The glasses were cooled at furnace rate.

The glass samples, with opalized patterns developed therein corresponding to the masking patterns, were then immersed in a molten salt bath composed of one mole percent pure silver nitrate, the balance being reagent grade sodium nitrate. The bath was held at 375° C. and exposure was for a period of 16 hours.

The samples were then removed, cooled, cleaned in distilled water, and placed in an atmosphere of flowing 100% hydrogen at a temperature of 400° C. Standard firing time was five (5) minutes, although the effects of longer times were also studied.

A number of masked samples were exposed for two minutes, then heat treated, silver ion exchanged, and fired in hydrogen for five minutes at 400° C. This provided side-by-side comparison of unexposed, uncrystallized areas versus exposed, crystallized areas.

Electron microscopy revealed obvious differences between the surface layers formed on the opal (exposed) and on the transparent (unexposed) regions of a sample when hydrogen fired. The layers formed in the transparent regions of both the sodium fluoride and the lithium metasilicate glasses consisted of isolated, discrete islands of silver metal. Since the islands did not touch one another, there were no continuous electrical pathway across a sample, and conventional metallic electrical conduction could not occur. In contrast, layers which formed on the opal regions of the sodium fluoride glasses consisted of a larger number of smaller, contiguous islands. Some tortuous metallic pathways extended across these samples. They were thus conventional metallic conductors, although rather poor ones—the resistivity being about $10^4$ ohms/square.

The layers on the opal regions of the lithium metasilicate glasses consisted of a continuous silver film. This appeared to be the result of many small individual islands coalescing. The continuous nature of this layer resulted in a typically low resistivity of about one ohm/square.

Temperature ceofficients were determined by resistivity measurements at varying temperatures on a lithium metasilicate glass test piece. Initial resistivity in the metal conductor zone (deposit of silver corresponding to exposed crystalline area) was 1.65 ohms/square. This was found to vary in a linear manner with temperature, the coefficient being about 1800 parts per million(ppm)/°C.

When the hydrogen firing time was extended, resistivity of the silver film descreased until a value near 0.1 ohm/square was reached. The temperature dependence increased only slightly with hydrogen firing time, ultimately reaching a coefficient value of about 2200 ppm/°C. In similar manner, resistivity measurements were made across the silver films formed on the surface of an unexposed, and hence uncrystallized, zone. In general, extremely high resistivities, indicative of extreme discontinuity in the silver coating, were observed. After the initial 5 minute hydrogen firing an activated resistivity was observed with an activation energy in the range 0.6–0.7 eV. This was assumed to be the activation energy for conduction by $Ag^+$ ions in the glass, since the same activation energy was measured in samples which had not been hydrogen fired. In comparison, the activation energy for conduction of the glass, as made, is in the range 0.9–1.0 eV.

As the hydrogen firing time was increased, both the resistance and the activation energy became larger. This resulted from replacement of $Ag^+$ by smaller, more tightly held $H^+$ in the glass structure. Some of the $H^+$ escaped as $H_2O$ which removed charge carriers and also raised the resistivity. The $Ag^+$ was reduced to $Ag^\circ$ which formed small metal particles in the bulk of the glass and on the surface of the sample. With hydrogen firing times greater than about 80 minutes, the silver particles had grown large enough and numerous enough so that there were only small spaces remaining between the discrete islands. Electron tunneling between islands then became probable enough that charge transport by that mechanism began to be comparable with charge transport by ionic diffusion. The tunneling activation energy (on the order of 0.010 eV) is much smaller than the diffusion activation energy so that basically there is a temperature-insensitive conduction component (tunneling) in parallel with a temperature-sensitive component (ionic diffusion) in the samples. Eventually, tunneling becomes the dominant charge transport mechanism, with ionic diffusion accounting for only a small fraction.

The temperature-insensitive conduction was attributed to tunneling between silver islands by analogy with cermets and discontinuous metal films formed by vacuum evaporation. All consist, in some composition regions, of discrete metal particles surrounded by a matrix of air, or some other dielectric such as silica or alumina, and all show activated conductivities with small (0.1–0.01 eV) activation energies.

With continued hydrogen firing, the resistances of the samples dropped abruptly to values of the order $10^3$ ohms/square, and the temperature coefficient of the resistance changed sign. This indicated that the silver islands had grown large enough to touch one another and form continuous metallic pathways across the sample, that is, the material underwent a percolation transition. The resistivity remained three orders of magnitude higher than was found in material which formed where the glass was exposed and thus opal. Presumably, only a few tortuous pathways carried most of the current. However, the similar values for the temperature coefficients of the two sorts of material indicated no fundamental difference in the material forming the conducting pathways in the glass regions which were originally opal and those which were originally homogeneous.

The small number of tortuous, current-carrying pathways in these samples was demonstrated by placing a piece of plastic containing temperature-sensitive liquid crystal atop the samples. Local heating, caused by current carried by the conducting pathways, manifested itself as color changes in the liquid crystal only in the few filamentary regions which were carrying current.

Switching is an abrupt change from a high resistance state to a lower resistance state. This was observed in unexposed glass samples which had been $Ag^+$ ion exchanged and hydrogen fired. Resistance changes of 8 orders of magnitude were often seen. This phenomenon was found to occur in otherwise noise-free samples when a high frequency electric field was applied normal to the plane of the sample or when a dc voltage applied in the plane of the sample exceeded a threshold value. Similar phenomena have been observed in coherers (small vials filled with metal filings used at the turn of the century for radiowave detection), cermet films, amorphous SiO films deposited between two metal films, calcium iron borate glasses, soda-bismuth borosilicate glasses before and after $Ag^+$ ion exchange, and discontinuous metal films. In most of these materials, switching to the low resistance state is thought to arise from transport, under the influence of a high electric field, of metal atoms which eventually form conducting filaments which span the sample. Usually it has been found that a short, high-current pulse will return the material to the high resistance state, apparently because of joule heating which burns out the conducting filaments.

The switching mechanism in these $Ag^+$ ion-exchanged photosensitive glasses appears to be not unlike that of the materials cited above. A sample of glass A was switched from a non-conducting state ($R \sim 10^{10}$ ohms) to a conducting state ($R \sim 10^4$ ohms) by application through a microscope slide of a high RF electric field generated by a Tesla coil. The temperature dependence of the resistance of the sample was then measured using a dc measurement technique, and found to be small and positive (i.e., metallic). The resistance was found to decay upward with time in a discontinuous manner, that is, periods of stable resistance were separated by abrupt increases.

Switching was found to manifest itself in the glass samples which had been exposed for times longer than that which produced the highly conductive material, that is, longer than five (5) minutes. These samples were over-nucleated, and hence not as much crystalline lithium metasilicate was present as in less heavily exposed samples. The value at which the sample switched to a conducting state typically fell at 1–2 v, but values in the range of 0–8 v were observed.

Most of the materials cited above as evincing switching exhibit so-called "memory" switching. Thus, the low resistance state is permanent until the sample is switched back again. This is in contrast to the transitory switching exhibited by these ion-exchanged, photosensitive glasses when subjected to low voltages or short RF field exposures. Higher voltages or longer ($\sim$ Minute) RF field exposure produced persistent switching in these glasses. In the case of long RF field exposure this apparently results from very minor changes in the structure of the Ag island film, probably as a result of electromigration.

Previous reports in the literature indicate that other materials which exhibited persistent switching could be returned to the high resistance state by application of a short, sharp current pulse which apparently burns out the conducting filaments. This was not found to be the case in these glasses. The samples could, however, be returned to the high resistance state by a short heat treatment (HT) at elevated temperature (eg. 5 min/300° C./air); this cycle [switch/switch back by HT] was repeated half a dozen times for some samples. The erasure of the conducting state by heat treatment at relatively low temperatures suggests that the conducting state may not, in fact, be permanent. Rather, its decay toward higher resistance may be activated in some way with an activation energy that is large.

While samples would switch on application of a dc in-plane voltage, an out-of-plane dc field of 20 KV/cm had no effect. An ac field of 2800 v/cm (peak-peak) at frequencies between 1 and 10 kHz applied normal to the plane of the sample resulted in a slow decrease in the resistance toward an asymptotic value that was much higher than that obtained when a Tesla coil was used for the switching. A Tesla coil generates an electric field at radio frequencies sufficient to break down air (30 KV/cm). It should be noted that the application of an out-of-plane ac field to a discontinuous sample of this sort will cause in-plane instantaneous voltage differences to appear, hence in-plane currents to flow.

It was found that the chemical machining process described by Stookey in U.S. Pat. No. 2,628,160 could be used to form shapes from glass A without foreclosing operation of the present method. Thus, a second processing cycle of expose/heat treat/ion exchange/hydrogen fire, as described above, could still be used to form conducting/nonconducting regions on the surface of the shape.

This process was used to form conducting pathways through the planes of some samples to allow electrical connections of one surface with the other. Holes were chemically machined through the sample by the chemical machining process. Then the regions surrounding the holes, which had not been previously exposed, were UV exposed, and the samples heat treated, ion exchanged and hydrogen fired in the usual manner. This caused the material surrounding the holes on both sides of the sample, and the material lining the hole, to become conductive, so that a continuous electrical pathway from one surface of the sample to the other was formed.

Glass substrates for copper pattern formation were prepared in the manner described above for silver patterns. Test pieces of glass A in 1.5 mm thickness were employed and appropriate patterns developed in the glass by selective exposure to ultraviolet radiation from a mercury arc lamp. The samples were thereafter heat treated as before to form nuclei and to grow crystals therein in exposed areas.

In contrast to $Ag^+$ exchange which was carried out in air at moderate temperatures, copper ion ($Cu^+$) exchange generally required higher temperatures and inert atmospheres. The general instability of copper salts at their melting temperatures caused use of either pure cuprous chloride (CuCl) or a mixture of the chloride with cuprous sulfide ($Cu_2S$). In any case, the cation in the bath was 100% copper, whereas silver was usually not over 5%. Ion exchange was effected in glass containers under flowing argon at temperatures of 450°–525° C. $Cu^+$ may also be ion exchanged into glass from volatile copper compounds, but the rate of exchange is very slow.

Once samples were cleaned, they were fired in flowing hydrogen at varying temperatures and for different lengths of time, as shown below. The samples were then allowed to cool for times on the order of 8–16 hours in flowing hydrogen to avoid possibility of oxidation.

In order to compare relative receptivity to $Cu^+$ exchange, samples of both clear glass and crystallized glass were given various ion exchange treatments, after which weight-gain measurements were made. Conditions of treatment and measured results are shown for several samples in TABLE II. The initial column shows the $Cu^+$ ion source (in all cases a molten bath) with 80-20 indicating 80 mole percent CuCl and 20 mole percent $Cu_2S$. The second column indicates clear glass (glass) or crystallized (opal). Time and temperature of salt bath exposure are then given in hours and °C., respectively. Finally, the weight gain in percent is set forth as calculated from weight measurements.

TABLE II

| IX Medium | Sample | Time (Hrs.)/ Temp. (°C.) | Weight Gain (%) |
| --- | --- | --- | --- |
| 80–20+ | Glass | 16/450 | 1.5% |
| CuCl | Glass | 16/450 | 0.5% |
| 80–20 | Opal | 16/450 | 0.8% |
| CuCl | Opal | 16/450 | 0.5% |
| 80–20 w/KCl | Glass | 16/375 | 0.1% |
| 80–20 | Glass | 16/450 | 1.3% |
| CuCl | Glass | 16/450 | 0.5% |
| 80–20 | Opal | 16/450 | 0.6% |
| CuCl | Opal | 16/450 | 0.3% |
| 80–20 | Glass | 16/525 | Broke |
| 80–20 | Glass | 4/525 | 1.5% |
| 80–20 | Glass | 1/525 | 0.9% |

The results are similar to those seen earlier for silver ion exchanged samples. Thus, clear glass samples, that is unexposed and uncrystallized, show on the order of twice as much weight gain as do crystallized glass. However, in spite of higher temperature and longer times, the $Cu^+$ gain is comparably much smaller than silver. This indicates a markedly slower exchange rate.

It was observed that the surface quality of crystallized glass samples, after ion exchange, was good. The clear glass samples tended to have a wrinkled or ridged surface believed to be caused by the greater copper content; good surface quality was obtained in clear glass samples by limiting the ion exchanges to 1 hour at 525° C.

Crystallized glass samples were ion exchanged for one hour in an 80/20 salt bath at 525° C. under an argon atmosphere. The samples were then cleaned and fired in flowing hydrogen for one hour at 450° C. and cooled under hydrogen over a period of about eight (8) hours. Resistivity measurements were made as described earlier. These were in the range of 2.0–2.5 ohms/square over a range of 0°–100° C. with a linear temperature coefficient of about 1500 ppm/°C.

Clear glass samples were ion-exchanged, both at 450° C. and 525° C. and then hydrogen fired. In order to provide electrodes for measurement of electrical properties, suitable areas were crystallized on each sample so that, after treatment, conductive copper electrodes were present on each sample. After firing in hydrogen, the surfaces of these samples were covered with a discontinuous layer of discrete copper islands. Electron transport in such layers occurs by tunneling from island to island. This is characterized by an activation energy, E, which depends on the average island radius "r" and separation "s" as shown in the formulation:

$$E \quad \frac{1}{r} - \frac{1}{r+s}$$

Samples which received shorter time, lower temperature, hydrogen firings, for example one hour at 350° and 400° C. and 16 hours at 350° C., all displayed a common behavior. They showed activated resistivities with two temperature regions characterized by different activation energies present.

In the higher temperature region, $E \sim 0.65$ eV, which is believed characteristic of $Cu^+$ diffusion. A similar value ($E = 0.72$ eV) was obtained using silver paint electrodes on a sample which had been $Cu^+$ ion exchanged but not hydrogen fired. In contrast, clear glass displayed $E = 1.00$ eV, probably characteristic of $Li^+$ diffusion, when measured similarly.

In the lower temperature region, electron transport occurs by tunneling from copper island to copper island. Here, the hydrogen-fired samples had activation energies in the range 0.050–0.065 eV. These values are larger than were found in a similar regime for $Ag^+$ ion exchanged material similarly treated. Thus, the copper islands in and on the surfaces of $Cu^+$-exchanged samples are considered to be smaller and/or farther apart than the silver islands described earlier.

Longer, and particularly higher temperature (450° C.), hydrogen firing resulted in higher activation energies in the high temperature region. This probably resulted from depletion of relatively mobile $Cu^+$ in the glass so that a larger fraction of the current was carried by relatively immobile $Li^+$ (with $E \sim 1.00$ eV). The $Cu^+$ which is removed from the glass forms a layer of islands which are relatively larger and farther apart than when formed at lower temperatures. These conduct so poorly that the low activation energy region is experimentally inaccessible.

A series of crystallized glass samples was prepared employing varying exposure times prior to the crystallizing heat treatment. These samples were subjected to ion exchange from a copper chloride vapor either in an experimental chamber for 68 hours at 525° C. or a commercial kiln for about one hour at 580° C.

Approximate surface resistivities were measured at room temperature with a volt-ohm-multimeter. The data obtained is shown in TABLE III below. In general, no very small resistivities were encountered, thus indicating less exchange from a vapor than from a bath.

In the TABLE III, Example 1 was suspended in CuCl vapor for 68 hours at 525° C.; thereafter it was fired in flowing hydrogen for 12 hours at 400° C. plus six hours at 500° C. Examples 2, 3 and 4 were treated in a similar atmosphere for about one hour at 580° C. Example 2 was then fired in hydrogen for 2½ hours at 400° C. while Examples 3 and 4 were fired for one hour at 450° C. and four hours at 350° C., respectively. As indicated earlier, the original samples were given varying exposures and the table shows exposure times in minutes and resistivities, when measurable, in ohms/square.

TABLE III

| Example | Exposure Time (minutes) | Resistivity (ohms/square) |
|---|---|---|
| 1 | ½ | 100 |
| 1 | 2 | ∞ |
| 1 | 10 | ∞ |
| 2 | ½ | 1,000 |
| 2 | 2 | 20,000 |
| 2 | 10 | 20,000 |
| 3 | ½ | 20,000 |
| 3 | 2 | ∞ |
| 3 | 10 | 30,000 |
| 4 | ½ | 3,000 |
| 4 | 2 | 5,000 |
| 4 | 10 | 200,000 |

Several samples of clear glass were suspended in the saturated vapor over a 20 mole percent $Cu_2S - 80$ mole percent CuCl molten bath for 16 hours at a temperature of 525° C. When reduced for 16 hours at 350° or 450° C., these samples displayed noisy resistivities on the order of $10^3$ to $10^6$ ohms/square with metallic temperature dependence. The behavior was similar to silver samples after several hours of hydrogen firing and consequent island coalescence after a percolation transition. It is believed this behavior is due to smaller, more closely packed islands forming from vapor exchanged, rather than bath exchanged, samples.

I claim:

1. A metal-glass composite comprising a photosensitive glass body with opacifying crystallites selected from the group of lithium silicates, barium silicate, and alkali metal fluorides developed in at least a portion thereof and a deposit of a metal selected from the group of copper, silver, and thallium on and integral with the glass surface coincident with the crystallized portion, said deposit consisting of small individual islands of metal which exhibit electrical conductivity.

2. A metal-glass composite according to claim 1 wherein the entire glass body has crystallites uniformly developed therein and wherein said deposit consists of small contiguous individual islands of metal which have coalesced into a continuous metal film to form a uniform, electroconductive metal coating over the surface thereof.

3. A metal-glass composite according to claim 1 wherein a portion of the glass body has crystallites developed therein, another portion is free of crystallites, and the entire surface of said body has a deposit of metal on and integral therewith, the deposit of metal on and integral with the surface of the crystallized portion consisting of small contiguous individual islands of metal which have coalesced into a continuous metal film to form a uniform, electroconductive metal coating, and the deposit of metal on and integral with the surface of the portion of said body free of crystallites consisting of isolated discrete islands of metal.

4. A metal-glass composite according to claim 3 wherein the deposit of metal on and integral with the surface of the portion of said body free of crystallites has a resistivity on the order of $10^{10}$ to $10^{12}$ ohms/square.

5. A metal-glass composite according to claim 3 wherein the crystallization in the glass body is limited in degree and the deposit of metal on and integral with the surface of the body has a resistivity on the order of $10^{10}$ to $10^{12}$ ohms/square which may be switched temporarily to a lower value on the order of $10^4$ ohms/square.

6. A metal-glass composite according to claim 3 wherein the deposit of metal on and integral with the surface of the portion of said body free of crystallization has undergone a percolation transition and is a metallically conducting pattern with a resistivity on the order of one thousand to ten thousand ohms/square and a linear temperature dependence.

7. A metal-glass composite according to claim 1 wherein at least a portion of the glass body has been removed by chemical machining prior to the deposit of metal on and integral with the surface of said body being formed.

8. A metal-glass composite according to claim 2 wherein said deposit on and integral with the glass surface coincident with the crystallized portion consists of a continuous film of silver that is metallically conducting with a resistivity not over about one ohm/square and a temperature coefficient on the order of 2000 ppm/°C.

9. A metal-glass composite according to claim 2 wherein said deposit on and integral with the glass surface coincident with the crystallized portion consists of a continuous film of copper that is metallically conducting with resistivity on the order of 2–2.5 ohms/square and a temperature coefficient on the order of 1500 ppm/°C.

10. A metal-glass composite according to claim 1 wherein said glass body is free of crystallites and wherein said deposit on and integral with the glass surface consists of copper in the form of isolated discrete islands giving a resistivity on the order of $10^{12}$ ohms/square.

* * * * *